Patented May 1, 1945

2,374,767

UNITED STATES PATENT OFFICE 2,374,767

GREASE-RESISTANT FILM

James Albert Mitchell, Kenmore, and Daniel Deacon Lanning, Williamsville, N. Y., assignors to E. I. du Pont de Nemours & Company, Wilmington, Del., a corporation of Delaware No Drawing. Application September 2, 1942, Serial No. 457,048

1 Claim. (Cl. 117—144)

This invention relates to novel grease-resistant films. More specifically, it relates to films of non-fibrous, water-sensitive, synthetic material such as regenerated cellulose films and polyvinyl alcohol films having coatings thereon which are oil- and grease-resistant and capable of being heat-sealed to form a substantially lasting seal.

In the packaging of edible oils and fats, lubricating oils and greasy foodstuffs, there is an ever-increasing demand for the employment of non-metallic containers, especially containers of fibrous materials provided with suitable interliners. The materials which immediately suggest themselves as most suitable for use as the interliner are, of course, the transparent, grease-resistant films of non-fibrous, water-sensitive, synthetic materials such as regenerated cellulose and polyvinyl alcohol. However, these materials as heretofore constituted are not entirely satisfactory as interliner material for the following reasons: An interliner for packaging edible oils and fats, lubricating oils and greasy foodstuffs should be, for obvious reasons, (1) oil and grease-resistant, (2) heat-sealable and (3) for many applications, moistureproof. Films of non-fibrous, water-sensitive, synthetic materials known today do not in any instance fulfill all of these requirements; plain, uncoated films of regenerated cellulose, for example, are oil- and grease-resistant to a satisfactory degree but they are not heat-sealable and they are not moistureproof. To supply the first or both of these latter deficiencies it has been the practice to coat the base film of regenerated cellulose with a composition which is heat-sealable and moistureproof. However, coated films which are on the market, although heat-sealable, moistureproof and anchored, fail at the heat seal under the present proposed conditions of use. This is due to the fact that all ingredients of such coatings, with the exception of nitro-cellulose, are soluble in oils. Leaching-out of the plasticizer, wax and resin therefore occurs and the seal and, of course, also moistureproofness, is thus destroyed.

An object of this invention, therefore, is to provide a coating composition for films of non-fibrous, water-sensitive, synthetic material, which composition will be grease- and oil-resistant, heat-sealable to yield a lasting seal, and permanently moistureproofed where desired. It is a further object to produce such compositions which will adhere tenaciously to the surface of said film. It is a still further object to produce permanently moistureproofed, oil- and grease-resistant films which may be sealed solely by the application of heat and pressure. It is a still further object to produce heat-sealable, grease- and oil-resistant films which have a controlled degree of substantially permanent moistureproofness. It is a still further object to produce oil- and grease-resistant, moistureproof, heat-sealable pellicular structures which will maintain their characteristics even after prolonged exposure to grease and oil, either hot or cold. It is a still further object to provide fibrous containers lined with said pellicular structures. Other objects will appear hereinafter.

These objects are realized by this invention which, briefly stated, comprises coating one or both sides of a sheet or film of non-fibrous, water-sensitive, synthetic material with a composition comprising essentially a film-forming material, an oil-insoluble plasticizer, and optionally, an oil-insoluble, "thermosetting," synthetic resin to enhance heat-sealing and anchorage, and a moistureproofing material.

For convenience, the invention will be described in connection with the coating of regenerated cellulose film softened with glycerol or a glycol, although it is to be understood that it is not limited thereto but encompasses all film of other non-fibrous, water-sensitive, synthetic material such as glycol cellulose, cellulose glycollic acid, lowly esterified and lowly etherified cellulose derivatives wherein each ester or ether group is associated with a plurality of cellulose units, and other cellulose structures of similar character, together with the softening materials used in connection with such film.

The film-forming material in the coating composition of this invention may be selected from the group consisting of cellulose derivatives such as nitrocellulose, cellulose acetate, cellulose acetate-butyrate, cellulose acetate-propionate, or ethyl cellulose, polyvinyl derivatives such as polyvinyl acetate, polyvinyl chloride, polyvinyl formal, polyvinyl acetal, interpolymers of polyvinyl chloride and polyvinyl acetate, polyvinyl butyral, methacrylate polymers such as polymerized methyl-, ethyl- or butyl-methacrylate, and rubber and rubber derivatives such as "Plioform," "Iraform," etc.

Preferred oil-insoluble plasticizers in the coating compositions of this invention are the mono- and di-ether alcohol esters of dicarboxylic acids, such as phthalic, oxalic, succinic, and adipic acids, containing not more than six carbon atoms in the ether alcohol radical. These plasticizers are insoluble in hot and cold oils and greases. The ether alcohol esters of phthalic acid are an especially satisfactory group of plasticizers falling within the preferred class; examples of such esters are mono- and di-(glycol monomethyl ether) phthalate, mono- and di-(glycol monoethyl ether) phthalate, mono- and di-(glycol monopropyl ether) phthalate, mono- and di- (glycol monobutyl ether) phthalate, mono- and di-(diethylene glycol monomethyl ether) phthalate, mono- and di-(diethylene glycol monoethyl ether) phthalate.

Also useful for the purposes of this invention are plasticizers of oil-insoluble amides. Examples of amides suitable as plasticizers are N-substituted aryl sulfonamides such as dimethyl toluene sulfonamides, mono and diethyl toluene sulfonamide, monopropyl toluene sulfonamide, and monobutyl benzene sulfonamide; N-cyclohexyl amides such as cyclohexyl benzene sulfonamide, cyclohexyl toluene sulfonamide, cyclohexyl glycolamide, cyclohexyl crotonamide, cyclohexyl 2-ethyl butyramide, and dicyclohexyl myristamide; aryl amides such as benzamide, dimethyl benzamide, diethyl benzamide, and monobutyl benzamide; amides of methylene dicarboxylic acids such as N-N' diamyl sebacamide, N-N' dibutyl adipamide, N-N' diethyl succinamide, N-N' dibutyl oxamide, N-N' dibutyl malonamide, N-N' dibutyl azelamide, and N-N-N'-N' tetra-ethyl adipamide; and N-substituted monoaryl amides of aliphatic acids such as monophenyl acetamide, monophenyl propionamide, monophenyl butyramide, monophenyl caproamide, and monophenyl capyramide.

The oil-insoluble, thermosetting, synthetic resin is preferably partially polymerized alkyl urea formaldehyde resins (the degree of polymerization being insufficient to give insolubility in the usual organic solvents used in preparing the coating compositions).

A catalyst is generally included to promote the further polymerization of the resin upon drying of the coating upon the film. Toluene sulfonic acid, which has been treated to remove therefrom the last traces of sulfuric acid, has proven to be a satisfactory catalyst for the purposes of this invention. Following is a suggested method for purifying crude toluene sulfonic acid to fit it for use as a polymerization promoting catalyst:

A 50% solution of the crude acid is made up by dissolving it in isobutanol. This step is carried out in acid resistant equipment or glass. The solution is then heated to boiling and the theoretical quantity of calcium hydroxide added to just neutralize the sulfuric acid present as an impurity. The calcium hydroxide should be added cautiously to avoid excessive foaming and the reaction mixture should be vigorously stirred. After the foam subsides, the solution is further boiled for fifteen minutes. The calcium hydroxide can be added before the acid solution is heated; however, it has been found by experience that this is not satisfactory since a very vigorous reaction takes place at about 90° C. which causes a large amount of foaming accompanied by the development of a great deal of heat. While the solution to which the calcium hydroxide has been added is still hot, the precipitated calcium sulfate is filtered off in a Buchner funnel to which suction is applied. An analysis of the clear filtrate is then made to make certain it is free of sulfate. The per cent sulfonic acid is determined and the solution is then ready for use.

As the moistureproofing material, a wax or wax-like material, for example, paraffin wax, may be used. It is generally desirable to include blending agents such as certain gums and resins, which will serve to blend the wax with the film-forming or cementing agent giving clarity in the film. Likewise, certain slip agents and other materials with special properties may be included where desired.

The coating composition of this invention may be applied to one or both sides of an uncoated base film, or it may be applied to subcoated film. The usual methods used for coating the film, for example, those disclosed in U. S. Patent No. 1,826,696 (Charch and Prindle), are used. In general, the non-fibrous, water-sensitive, synthetic films are coated with sufficient solution that upon evaporation of the solvent, approximately two to twenty grams of coating per square yard of film remains; this applies to films coated on both sides. Where the coating is deposited upon one side only of the film, approximately 1 to 10 grams of the composition remain upon evaporation of the solvent.

Moistureproofness, moistureproofing and moistureproof materials and expressions are defined in U. S. A. Patent No. 2,147,180 (Ubben). The definition of, and the test for determining, the value of "heat seal bond strength" is set forth in U. S. A. Patent No. 2,236,546 (Mitchell). In the interest of brevity, the definitions are not repeated here. The terms and expressions related thereto and employed herein are used in accordance with such definitions.

The invention will be further illustrated by the following examples in which the percentages are by weight unless otherwise specified.

*Example I*

A sheet of regenerated cellulose softened with approximately 25% ethylene glycol was first coated with the following composition:

| | Per cent |
|---|---|
| Nitrocellulose (11.4% nitrogen content) | 4.00 |
| Partially polymerized isobutyl ether of dimethylol urea | 5.34 |
| Paratoluene sulfonic acid | 0.66 |
| Ethyl acetate | 40.50 |
| Toluene | 18.00 |
| Isobutanol | 31.50 |

After evaporation of solvents, the above subcoated film was coated with the following composition:

| | Per cent |
|---|---|
| Polyvinyl acetate (viscosity, low (7)) | 4.68 |
| Nitrocellulose—nitrogen content 11.4% N | 4.68 |
| Di(methyl cellosolve) phthalate | 2.64 |
| Toluene | 35.20 |
| Ethyle acetate | 50.80 |
| Ethyl alcohol | 2.00 |

The resulting film was well anchored, gave a heat seal bond strength of 340 grams, had a moisture permeability of 5000, and was grease- and oil-resistant in a high degree.

*Example II*

A sheet of 300 gauge regenerated cellulose film containing 15% glycerol was coated with the following composition:

| | Per cent |
|---|---|
| A 50–50 interpolymer of polyvinyl chloride and polyvinyl acetate (viscosity, low) | 4.12 |
| Nitrocellulose (11.4% nitrogen) | 4.73 |
| Di(glycol mono-ethyl ether) phthalate | 3.15 |
| Toluene | 35.00 |
| Ethyl acetate | 53.00 |

After evaporation of the solvent, the resulting film was found to be extremely grease- and oil-resistant, even at temperatures up to 70° C. and to give a heat seal bond strength in excess of 200 grams. The moisture permeability was 5000.

Example III

Regenerated cellulose film containing 25% ethylene glycol as a softening agent was coated with the following composition:

| | Per cent |
|---|---|
| Polyvinyl butyral (viscosity, medium) | 4.67 |
| Nitrocellulose (12% nitrogen) | 4.67 |
| Mono(diethylene glycol mono-ethyl ether) phthalate | 2.66 |
| Ethyl acetate | 53.00 |
| Toluene | 35.00 |

Upon evaporation of the solvent, the film was found to be extremely resistant to grease and oil, and to give good heat seal bond strength.

Example IV

Regenerated cellulose film of 0.00088 inch thickness containing 15% glycerol as the softener was coated with the following composition:

| | Per cent |
|---|---|
| Di(diethylene glycol mono-ethyl ether) phthalate | 3.00 |
| Partially polymerized dibutyl urea formaldehyde resin | 3.00 |
| Maleic acid | 0.56 |
| Beckacite 1110 resin (maleate modified ester gum) | 1.20 |
| Paraffin wax (melting point 60° C.) | 0.35 |
| Nitrocellulose (11.4% nitrogen) | 3.89 |
| Ethyl acetate | 40.60 |
| Toluene | 35.30 |
| Isobutanol | 12.40 |

The coated film had a moisture permeability of 50 and a heat seal of 200 grams. The coating was grease-resistant and well anchored.

Example V

A sheet of regenerated cellulose softened with approximately 25% ethylene glycol was coated on one side with the following composition:

| | Per cent |
|---|---|
| Nitrocellulose (11.4% nitrogen content) | 4.00 |
| Partially polymerized isobutyl ether of dimethylol urea | 5.34 |
| Para-toluene sulfonic acid | 0.66 |
| Di(diethylene glycol mono-ethyl ether) phthalate | 3.00 |
| Ethyl acetate | 39.00 |
| Toluene | 17.50 |
| Isobutanol | 30.50 | and upon the other side with the following composition:

| | Per cent |
|---|---|
| Nitrocellulose (11% nitrogen) | 6.14 |
| Dibutyl phthalate | 1.22 |
| Dicyclohexyl phthalate | 3.67 |
| Paraffin wax | 0.36 |
| Damar resin | 0.60 |
| Ethyl acetate | 58.33 |
| Toluene | 26.35 |
| Isopropyl alcohol | 3.33 |

After evaporation of the solvent, the film is obtained which is highly grease-resistant upon one side and highly moistureproof upon the other side. A strong heat seal bond can be obtained by contact between two faces having the same coating or between faces having different coatings by the application of heat and pressure. This wrapper is particularly well suited for wrapping greasy products which it is desired to protect from loss of moisture to the atmosphere, for example, chocolates. The wrapper is placed about the chocolate in such a manner that the side coated with the composition first given is in contact with the chocolate while the side coated with the other composition is on the outside in contact with the atmosphere.

Example VI

A sheet of regenerated cellulose containing 15% glycerol as the softening agent was coated with the following composition:

| | Per cent |
|---|---|
| Di(diethylene glycol mono-ethyl ether) phthalate | 3.00 |
| Partially polymerized butyl ether of dimethylol urea | 3.00 |
| Maleic acid | 0.56 |
| Modified rosin | 1.20 |
| Paraffin wax (melting point 60° C.) | 0.35 |
| Nitrocellulose (11.4% nitrogen) | 3.89 |
| Ethyl acetate | 40.60 |
| Toluene | 35.30 |
| Isobutanol | 12.40 |

After evaporation of the solvent, the coated film was found to be moistureproof, having a moisture permeability of 45, and was highly resistant to grease and oil.

Example VII

Regenerated cellulose film softened with 15% glycerol was coated with the following composition:

| | Per cent |
|---|---|
| Glycol mono-methyl ether phthalate | 2.81 |
| Partially polymerized mono-butyl urea formaldehyde resin | 1.97 |
| Maleic acid | 0.37 |
| Beckacite 1110 (maleate modified ester gum) | 1.20 |
| Paraffin wax (60° C. melting point) | 0.34 |
| Nitrocellulose (11.4% nitrogen content) | 2.50 |
| Butyl methacrylate polymer | 2.50 |

After evaporation of the solvent, the coated film was found to be highly grease- and oil-resistant, and to have a permeability value of 200.

Example VIII

A sheet of polyvinyl alcohol is treated in accordance with the conditions and with the compositions specified in Example I.

The resulting film, which was grease- and oil-resistant, gave a heat seal bond strength of 325 grams and had a moisture permeability of 5500.

Example IX

A sheet of polyvinyl alcohol was coated with the composition of Example IV.

After evaporation of the solvent, the resulting film was found to be well anchored, and was grease- and oil-resistant in high degree. The heat seal bond strength was 225, and the film showed a moisture permeability of 62.

Example X

A sheet of regenerated cellulose softened with glycerol was coated with the following composition:

| | Per cent |
|---|---|
| Partially polymerized isobutyl ether of dimethylol urea | 3.02 |
| Maleic acid | 0.58 |
| Benzamide | 3.60 |
| Nitrocellulose (11.4% nitrogen) | 3.60 |
| Paraffin wax (melting point 60° C.) | 0.36 |
| Gum damar (dewaxed) | 0.84 |
| Ethyl acetate | 40.48 |
| Toluene | 35.20 |
| Isobutanol | 12.32 |

After evaporation of the solvent the resulting film had a moisture permeability of 156, and a heat seal of 90 grams.

Example XI

A sheet of regenerated cellulose softened with glycerol was coated with the following composition:

| | Per cent |
|---|---|
| Partially polymerized isobutyl ether of dimethylol urea | 3.02 |
| Maleic acid | 0.58 |
| Diethyl toluenesulfonamide | 4.32 |
| Nitrocellulose (11.4% nitrogen) | 2.88 |
| Paraffin wax (melting point 60° C.) | 0.36 |
| Gum damar (dewaxed) | 0.84 |
| Ethyl acetate | 40.48 |
| Toluene | 35.20 |
| Isobutanol | 12.32 |

The resulting film, after evaporation of the solvent, was of good clarity, well anchored, and had a moisture permeability of 14.

Example XII

A sheet of softened regenerated cellulose was coated with the following composition:

| | Per cent |
|---|---|
| Partially polymerized dibutyl urea formaldehyde condensation product | 3.02 |
| Maleic acid | 0.58 |
| Diamyl sebacamide | 2.83 |
| Gum damar (dewaxed) | 0.84 |
| Paraffin wax (melting point 60° C.) | 0.36 |
| Nitrocellulose (11.4% nitrogen) | 4.32 |
| Ethyl acetate | 40.48 |
| Toluene | 35.20 |
| Isobutanol | 12.32 |

The solvent was evaporated and the resulting film was found to have a moisture permeability of 160, and a heat seal of 215 grams.

The coated sheets and films of this invention may be used as such or may be laminated together in two or more thicknesses by the application of heat and pressure, as by passing through heated rolls, or one sheet of such material may be laminated by heat and pressure to one or both surfaces of paper to form a composite product having the desirable features of this invention. Wrapping materials formed by this process may be folded about objects and heat sealed, or bags and other containers may be fashioned out of these articles with heat sealed seams and subsequently filled with the commodity and suitable closure made.

A particularly desirable form of a container employing the films of this invention are the spirally wound tubular paper containers having an integrally formed liner of spirally wound coated film in which the spirits are overlapping forming liquid tight seals and in which, furthermore, the liner is sealed to the inner surface of the paper container. Containers made from such tubular forms having liquid tight crimp end sections of metal or other material are in wide use as containers in dispensing means for lubricating oils and similar commodities. It is apparent that the grease resistance of the inner liner is highly important in such a connection, as is also the heat sealable characteristic of the films of this invention. These container bodies are most conveniently, expeditiously, and economically formed in a single operation upon a mandrel when the lining material is heat sealable and the use of adhesives therefore avoided. Where the wrapping material or lining material is not heat sealable, it is necessary to apply adhesives, which in general is laborious and time consuming in automatic operations inasmuch as the adhesive must be applied as a separate step and sufficient time allowed to elapse for the attainment of tackiness sufficient to hold the joint in place once the restraining means of the joint making apparatus is removed.

The coated films and sheets of this invention provide for the first time materials which are at once grease resistant and heat sealable, and in some instances moistureproof. This combination of properties is highly advantageous for the packaging in an economical manner of a large number of commodities which are greasy or oily, such as, for example, oleomargarine, hydrogenated vegetable shortening, lard, cocoa butter, butter, cream cheese, lubricating oil, and other petroleum greases and waxes, peanut butter, peanuts, nuts, grease and oil-containing foodstuffs such as candies, cakes, cookies, doughnuts, and animal fats such as stearin, lanolin.

Not only are these compositions resistant to cold oils and greases, but they are likewise resistant to hot oils and greases so that they may be used for the packaging of such greasy and oily materials in the hot state; for example, molten greases may be poured into such containers and allowed to solidify, thus simplifying the packaging operation.

The invention is not, of course, strictly limited to the exact materials and conditions above recited but comprehends rather all obvious modifications and equivalents falling within the terms and spirit of the invention as defined in the following claim.

We claim:

An oil- and grease-resistant heat sealable pellicle comprising a base film of regenerated cellulose coated on one side at least with a composition consisting of 39% by weight of polyvinyl acetate, 39% by weight of nitrocellulose having a nitrogen content of 11.4%, and 22% by weight of di(ethylene glycol monomethyl ether) phthalate.

JAMES ALBERT MITCHELL.
DANIEL DEACON LANNING.

CERTIFICATE OF CORRECTION.

Patent No. 2,374,767.                                May 1, 1945.

JAMES ALBERT MITCHELL, ET AL.

It is hereby certified that error appears in the printed specification of the above numbered patent requiring correction as follows: Page 2, second column, line 52, for "ethyle" read --ethyl--; page 4, first column, line 60, for "spirits" read --spirals--; and that the said Letters Patent should be read with this correction therein that the same may conform to the record of the case in the Patent Office.

Signed and sealed this 31st day of July, A. D. 1945.

Leslie Frazer (Seal)                              Acting Commissioner of Patents.